UNITED STATES PATENT OFFICE.

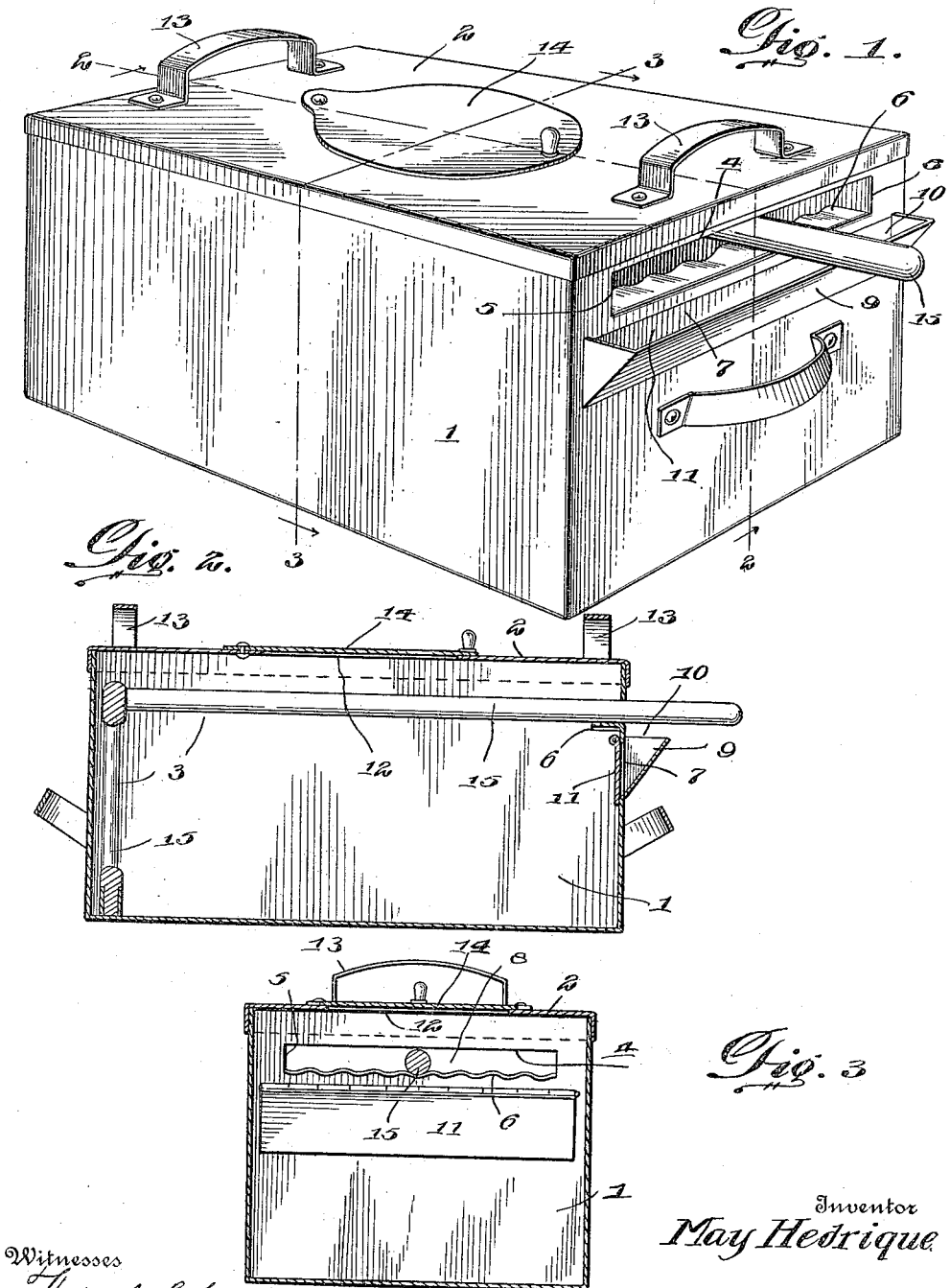

MAY HEDRIQUE, OF FARMINGTON, MISSOURI.

COOKING UTENSIL.

1,194,291. Specification of Letters Patent. Patented Aug. 8, 1916.

Application filed July 7, 1915. Serial No. 38,471.

*To all whom it may concern:*

Be it known that I, MAY HEDRIQUE, a citizen of the United States, residing at Farmington, in the county of St. Francois and State of Missouri, have invented new and useful Improvements in Cooking Utensils, of which the following is a specification.

This invention relates to a cooking utensil which may be used for preserving purposes, especially adapted for preparing marmalade and similar preserves which require constant stirring.

The primary object of the invention is to provide a cooking utensil of this character in which the contents thereof may be stirred continuously without removing the cover of the utensil, and to one in which the contents of the utensil which adheres to the handle of the stirring member may be removed and returned to the interior of the vessel as the handle of the stirring member is drawn backward and forward through an opening in the utensil.

A further object of the invention is to provide the utensil with a corrugated scraping blade which extends interiorly of the receptacle in such a manner as to cause the steam contained within the utensil contacting with the scraping blade and maintaining the adhering material on the agitating element which is scraped loose by the scraping blade remaining in a heated condition for a sufficient length of time to enable it to reënter the interior of the cooking utensil.

A still further object of the invention is to provide a check valve which is interposed between the interior of the utensil and a drip pan secured to the end wall of the utensil containing the scraper blade said valve permitting the contents of the drip pan to return to the interior of the body of the utensil while the contents of the utensil is prevented from entering the drip pan as the agitating member is operated.

With these and other objects in view the invention consists in the improved construction, novel combination and arrangement of parts which will be hereinafter fully described and particularly pointed out in the claims.

The preferred embodiment of the invention has been illustrated in the accompanying drawing, although no restriction is necessarily made to the precise details of construction therein shown, as changes, alterations and modifications within the scope of the appended claims may be resorted to when desired.

In the drawing:—Figure 1 is a perspective view of the improved cooking utensil constructed in accordance with the invention. Fig. 2 is a vertical longitudinal sectional view on the line 2—2 of Fig. 1. Fig. 3 is a transverse sectional view on the line 3—3 of Fig. 1.

Like characters of reference denote corresponding parts throughout the several views in the drawing.

The improved cooking utensil comprises a body 1 which is provided with a cover 2 and an agitating or stirring member 3 disposed for reciprocation within the body 1 of the receptacle.

The body 1 is rectangular in shape and has one of its end walls provided with a transversely extending slit 4 and vertically extending slits 5 which intersect the slits 4 adjacent the side walls of the body 1. The material bounded by the slits 4 and 5 is bent inwardly and corrugated to provide a scraper blade 6, the blade 6 also serving to support the handle of the agitating member 3.

The slitted end wall of the body 1 is further provided with a transversely extending slot 7, which is disposed adjacent the slot 8 formed in the end wall when the material bounded by the slit is bent inwardly to form the scraper blades 6, the slot 8 serving as a passage way for the handle 15 of the agitating member. Secured to the exterior of the end wall and covering the opening 8 therein is a drip pan 9 the top of which is open as indicated at 10 to receive a portion of the material contained within the utensil which is scraped from the handle of the agitating member 3 in its passage over the scraping blade 6.

A flap 11 is hingedly connected to the upper top wall of the slot 8 and serves as a check valve to prevent the contents of the utensil while being agitated by the stirring member 3 from entering the drip pan 9 through the slot 8 in the end wall, while the contents of the drip pan has free access to the interior of the body of the utensil by the arrangement of the hinged connection of the flap 11 with the end wall.

The numeral 2 designates a cover for the utensil which is provided with a centrally arranged aperture 12 and handles 13 by means of which the cover may be removed from the utensil when desired. The aperture 12 is adapted to afford an opening through which material may be inserted or removed from the utensil when in a heated condition, said aperture being closed by a pivoted cover 14 which prevents the escape of steam from the receptacle during the preserving operation.

To prevent the scorching of the contents of the utensil while in use, the agitating member 3 is provided. Said member comprises a head and handle 15 which extends when in use through the slot 7 in the end wall of the receptacle.

From the above statements it is apparent that as the handle of the agitating member is drawn backward and forward through the opening 7 in the end wall of the body, the contents of the kettle or utensil which may adhere to the handle 15 is scraped therefrom by the blade 6 and guided back into the interior of the utensil by the corrugation on the scraping blade 6. Any access of material from the handle 15 which might drip exteriorly of the end wall is caught by the drip pan 7 and through the action of the check valve or flap 11 is permitted to again enter the interior of the body 1. It will also be noted that the corrugated blade retards the escape of steam through the opening 7 by deflecting the same downwardly and against the flap 11, said steam serving to maintain any material which might adhere to the corrugations in the blade or the drip pan 9 in a heated condition to enable the same to more easily flow toward the interior of the receptacle.

From the foregoing description taken in connection with the accompanying drawing it can be easily seen that a cooking utensil for the purpose set forth has been provided, which is simple in construction, inexpensive of manufacture and highly efficient in use.

Having described the invention, what is claimed as new is:—

1. A cooking utensil comprising a handled agitator and a receptacle having an end wall slitted and the material bounded by the slit bent inwardly to provide an opening for receiving the handle of the agitating member, a drip pan carried by the end wall beneath said opening exteriorly of the body, and means for establishing communication between the drip pan and the interior of the body.

2. A cooking utensil comprising a handled agitator and a receptacle having a slitted end wall, a scraper blade formed from the material bounded by the slit and extending interiorly of the body to engage the handle of the agitator, corrugations formed in said blade to provide a plurality of deflecting surfaces, a drip pan secured exteriorly of the end wall adjacent the deflecting surfaces, and means for establishing communication between the drip pan and the interior of the utensil.

3. A cooking utensil comprising a handled agitator and a receptacle having a slotted end wall one of said slots providing a passage way for the handle of the agitating member, a scraper blade extending exteriorly of the body beneath said slot, a drip pan secured to the exterior of said end wall beneath said blade to receive a portion of the drippings therefrom, and a flap hinged to the end wall and normally closing the remaining opening therein to permit the contents of the drip pan to return to the interior of said body.

In testimony whereof I affix my signature in presence of two witnesses.

MAY HEDRIQUE

Witnesses:
 EFFIE ALEXANDER,
 Mrs. N. J. ALEXANDER.

Copies of this patent may be obtained for five cents each, by addressing the "Commissioner of Patents Washington, D. C."